(12) United States Patent
Mantovano et al.

(10) Patent No.: US 12,480,369 B2
(45) Date of Patent: Nov. 25, 2025

(54) THREADED CONNECTION FOR HAMMERING INTERCONNECTED TUBULAR MEMBERS

(71) Applicant: Tenaris Connections B.V., Amsterdam (NL)

(72) Inventors: Luciano Omar Mantovano, Campana (AR); Gastón Mauro Mazzaferro, Campana (AR)

(73) Assignee: Tenaris Connections B.V., Amsterdam (NL)

( * ) Notice: Subject to any disclaimer, the term of this patent is extended or adjusted under 35 U.S.C. 154(b) by 501 days.

(21) Appl. No.: 18/001,863

(22) PCT Filed: Jun. 14, 2021

(86) PCT No.: PCT/EP2021/065966
§ 371 (c)(1),
(2) Date: Dec. 14, 2022

(87) PCT Pub. No.: WO2021/254960
PCT Pub. Date: Dec. 23, 2021

(65) Prior Publication Data
US 2024/0384604 A1    Nov. 21, 2024

(30) Foreign Application Priority Data
Jun. 15, 2020   (NL) ...................... 2025828

(51) Int. Cl.
*E21B 17/042*   (2006.01)
*E21B 7/20*     (2006.01)
*F16L 15/06*    (2006.01)

(52) U.S. Cl.
CPC .............. *E21B 17/042* (2013.01); *E21B 7/20* (2013.01); *F16L 15/06* (2013.01)

(58) Field of Classification Search
CPC .......................... E21B 17/042; E21B 17/0426
See application file for complete search history.

(56) References Cited

U.S. PATENT DOCUMENTS

| | | | |
|---|---|---|---|
| 4,611,838 A * | 9/1986 | Heilmann | E21B 17/042 285/334.4 |
| 4,629,221 A | 12/1986 | Lumsden et al. | |
| 4,822,081 A | 4/1989 | Blose | |
| 6,485,063 B1 * | 11/2002 | Olivier | F16L 15/08 285/333 |

(Continued)

OTHER PUBLICATIONS

International Search Report for PCT/EP2021/065966, dated Aug. 17, 2021, 3 pages . . . .

*Primary Examiner* — Cathleen R Hutchins
(74) *Attorney, Agent, or Firm* — Knobbe, Martens, Olson & Bear, LLP

(57) ABSTRACT

A threaded connection for hammering interconnected tubular members into a ground, such as onshore land, for exploration and production of a hydrocarbon well, said threaded connection comprising a pin member comprising an external shoulder, a pin nose and a tapered pin threaded portion located between the external shoulder and the pin nose, and a box member comprising an internal shoulder, a box nose and a tapered box threaded portion located between the internal shoulder and the box nose.

19 Claims, 15 Drawing Sheets

(56) References Cited

U.S. PATENT DOCUMENTS

Figure 1C:
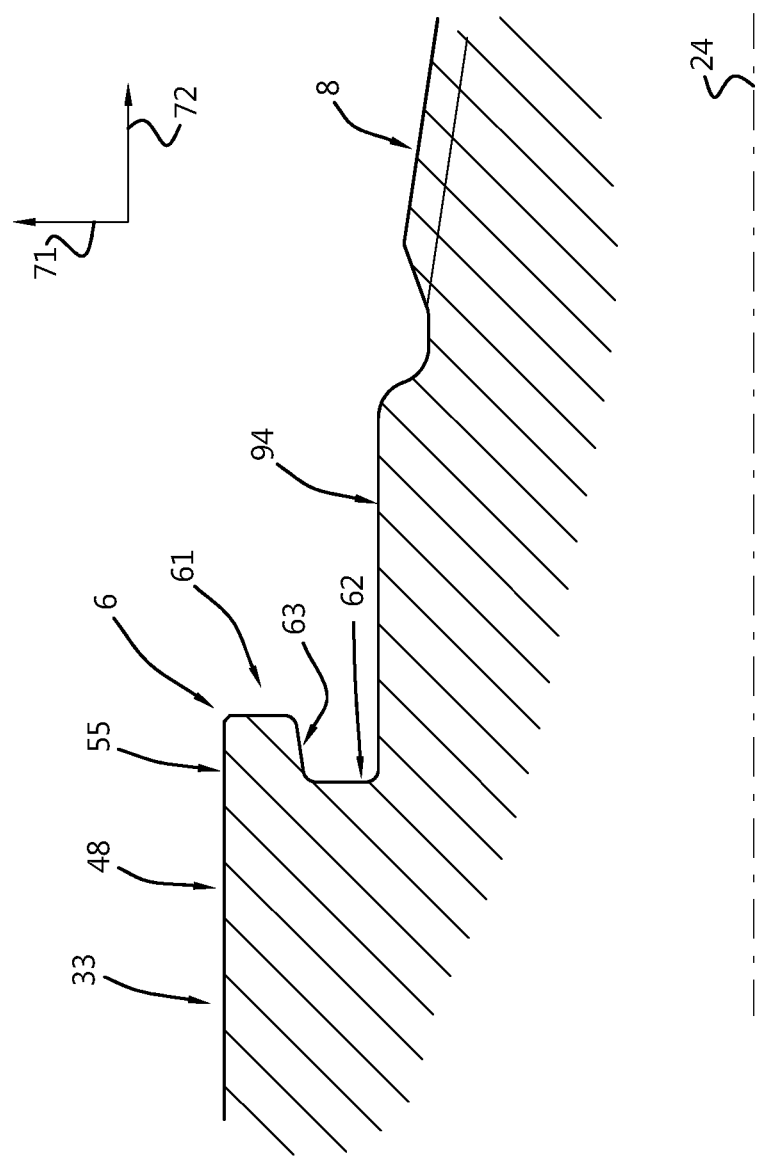

| | | | |
|---|---|---|---|
| 7,140,446 B2* | 11/2006 | Metcalfe | E21B 43/106 166/227 |
| 2003/0132633 A1* | 7/2003 | Maeda | F16L 15/06 285/333 |
| 2004/0130152 A1 | 7/2004 | DeLange et al. | |
| 2016/0208962 A1 | 7/2016 | Sugino et al. | |
| 2017/0292638 A1 | 10/2017 | Sugino et al. | |

* cited by examiner

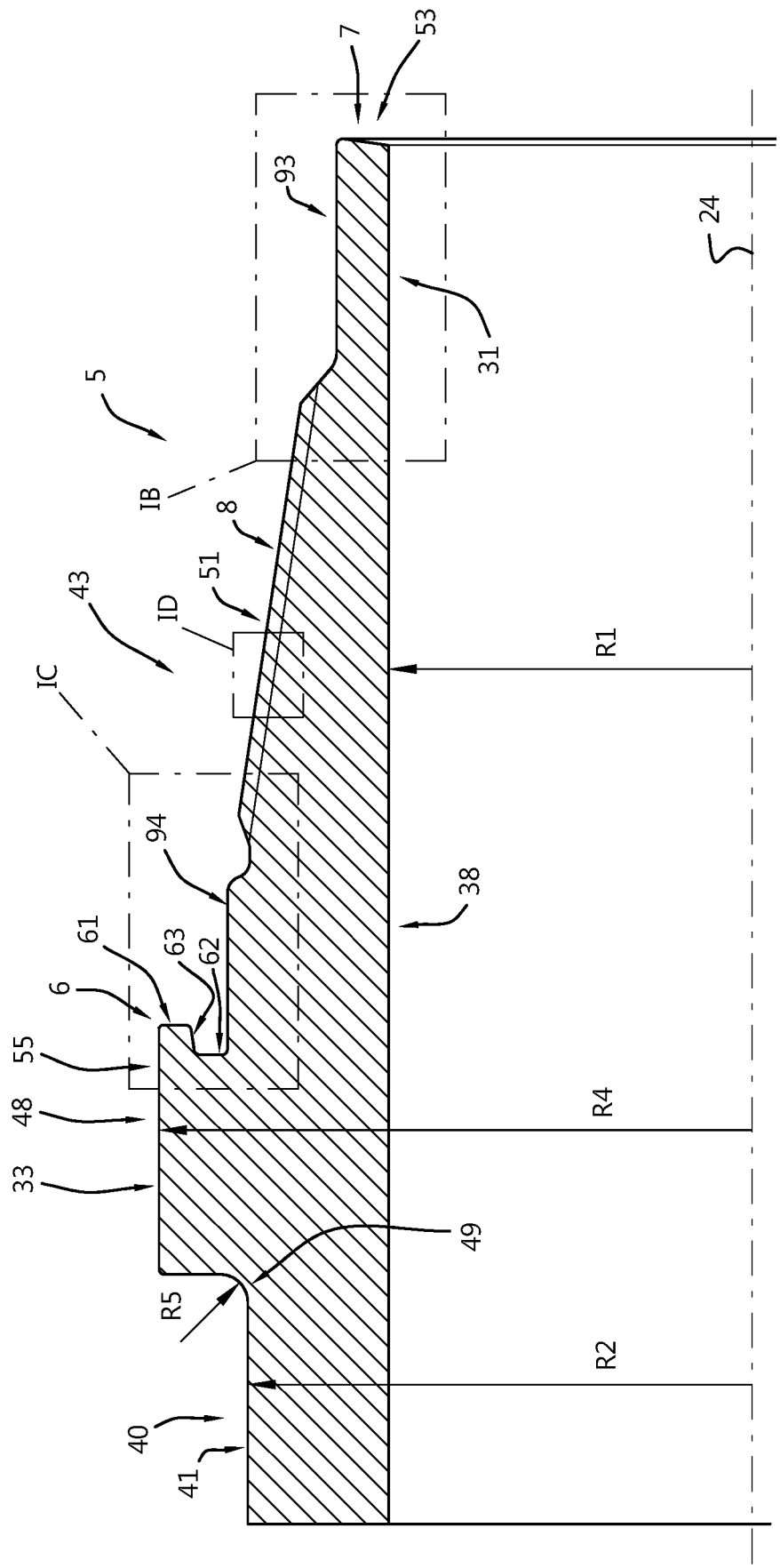

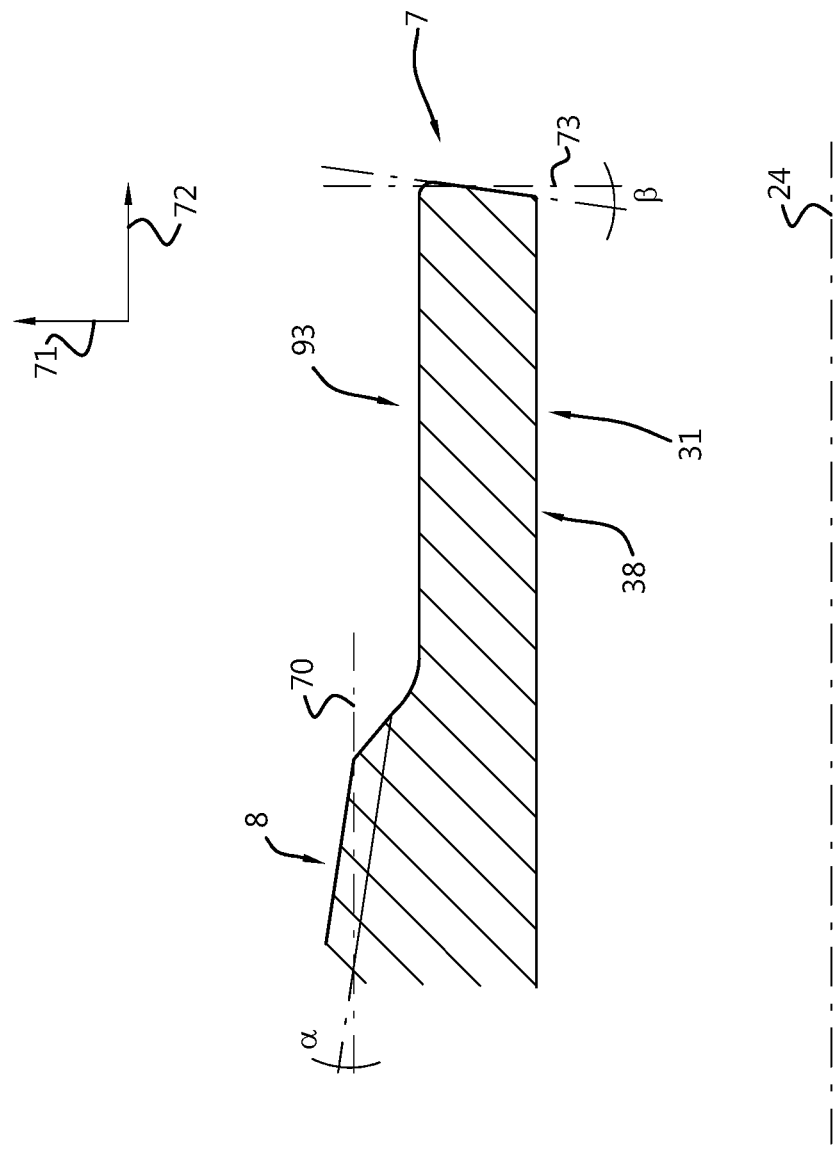

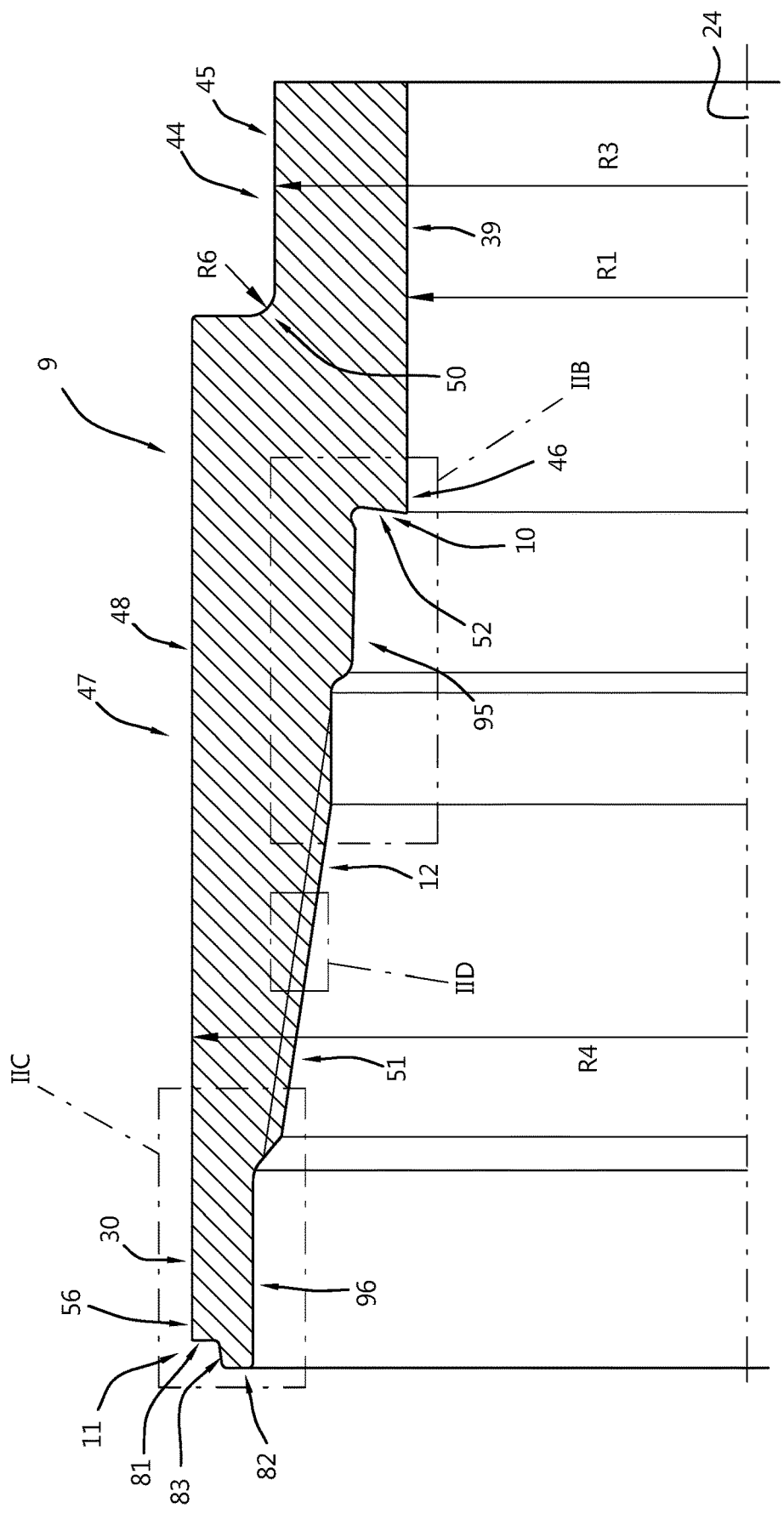

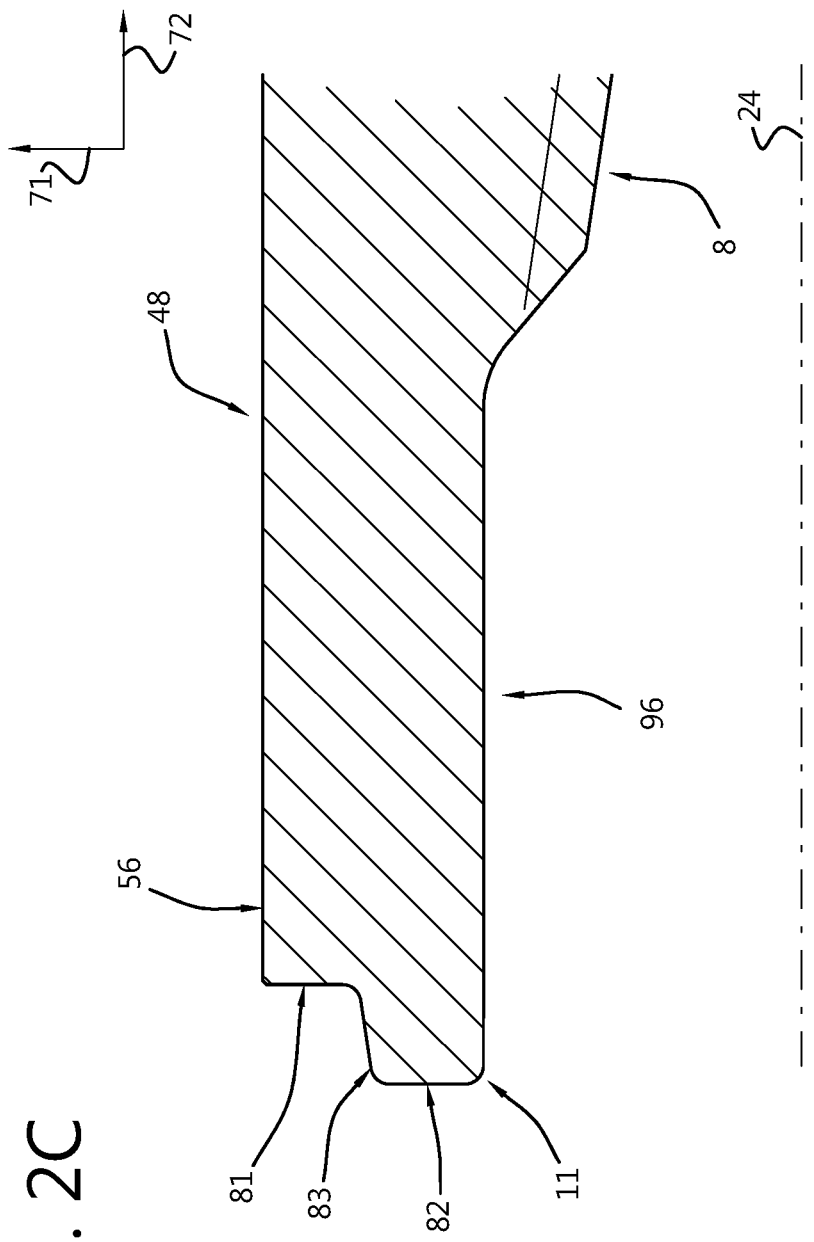

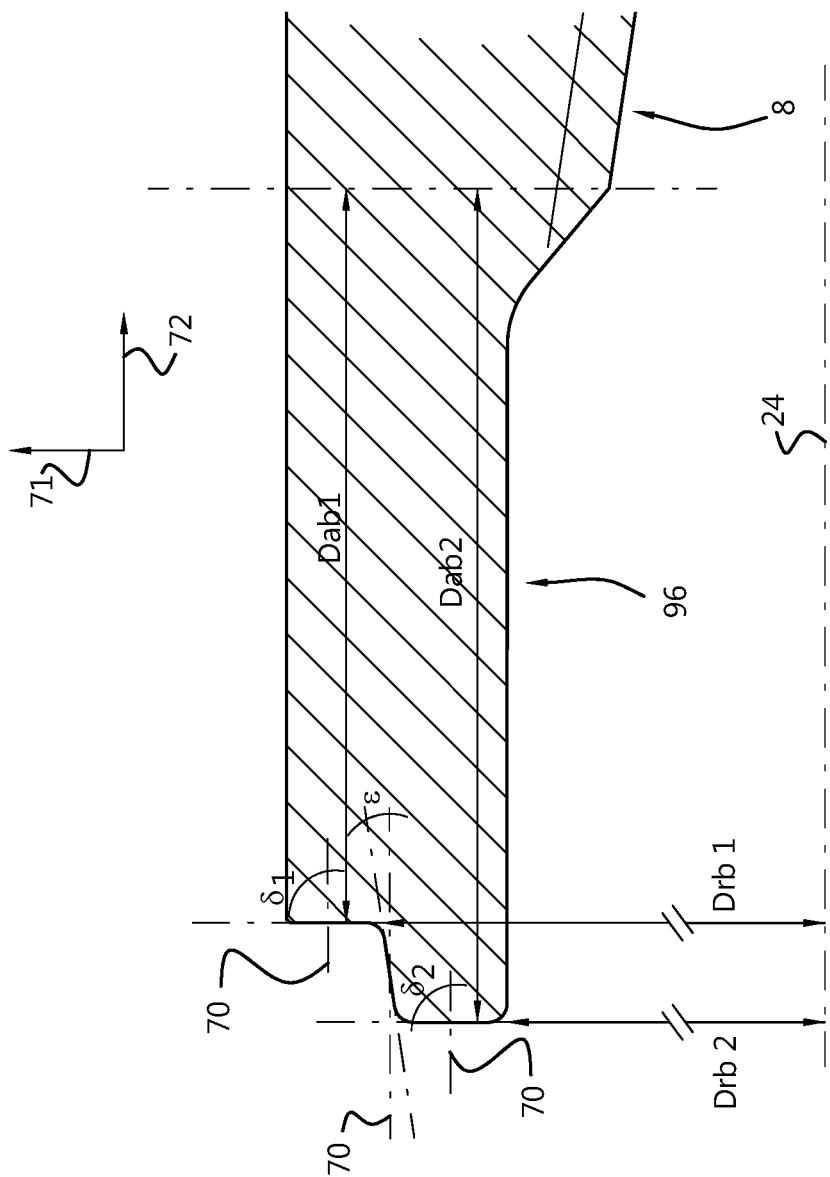

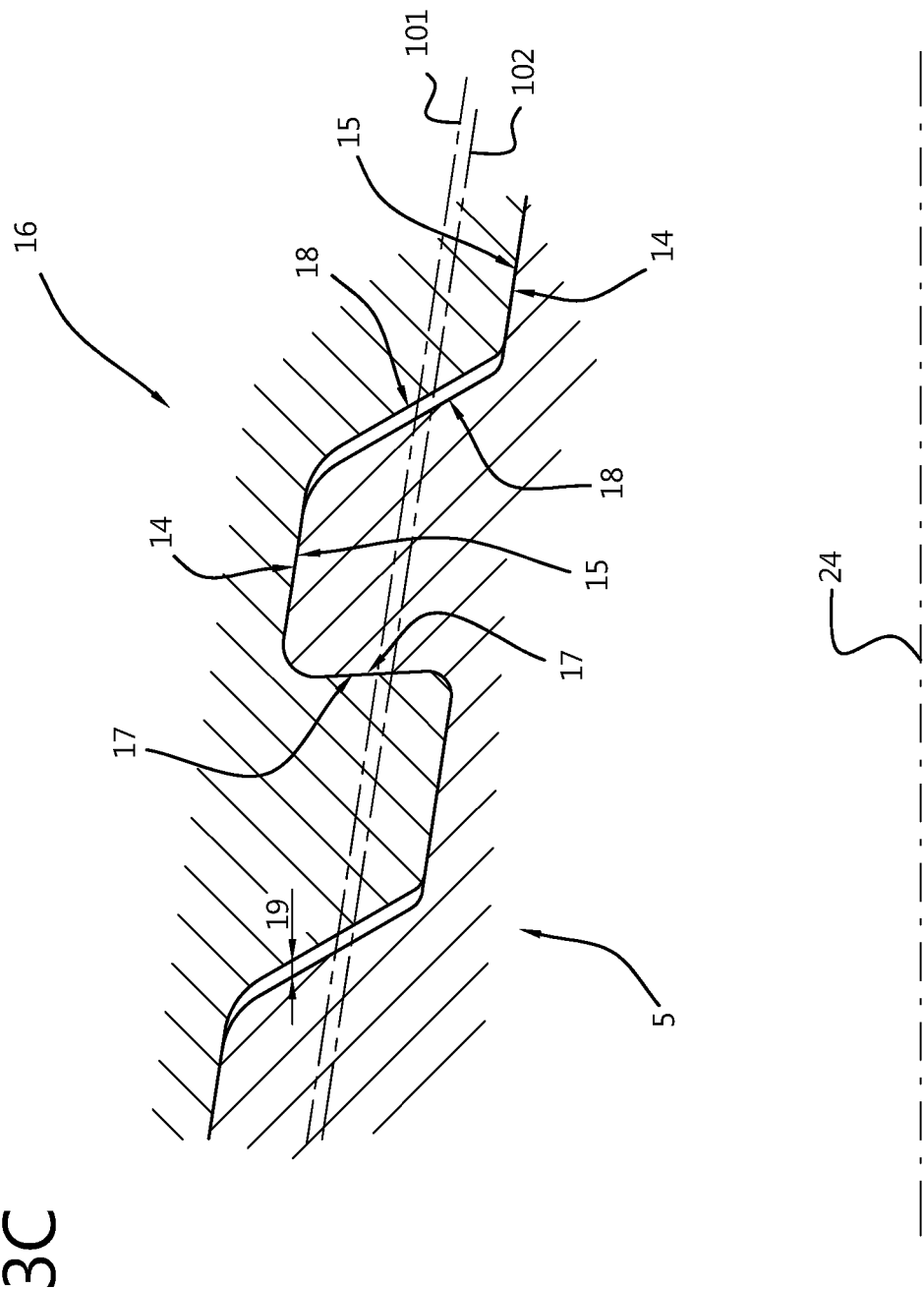

THREADED CONNECTION FOR HAMMERING INTERCONNECTED TUBULAR MEMBERS

FIELD OF THE INVENTION

The invention relates to a threaded connection for hammering interconnected tubular members into a ground for exploration and production of a hydrocarbon well. The ground may be any type of ground such as onshore land. The invention also relates to a method for hammering said interconnected tubular members in the ground for exploration and production of a hydrocarbon well.

BACKGROUND OF THE INVENTION

Hammering is used to drive a string of interconnected tubular members into a ground. A drive chaser is placed on top of the string tubular members to apply hammering impact forces to the string. This is a time efficient and therefore relatively cheap way to drive the string of tubular members into the ground. A seal located between the engaged threaded portions and the pin nose is typically provided to protect a threaded connection against damage created by overpressure inside the threaded connection.

SUMMARY OF THE INVENTION

The known threaded connections for hammering interconnected tubular members into the ground for exploration and production of a hydrocarbon have the disadvantage that they may get damaged. Said known threaded connections may have the disadvantage that it is difficult or time consuming to determine if the final make-up of the threaded connection is reached during make-up. Said known threaded connections may have the disadvantage that the threaded connection is damaged by the hammering such that its general performance is impaired. Said known threaded connections may have the disadvantage that the degree of sealing is negatively affected by the hammering or that the threaded connection is damaged by the hammering such that its general performance is impaired.

BRIEF DESCRIPTION OF THE INVENTION

The invention has the objective to provide an improved, or at least alternative, threaded connection for hammering interconnected tubular members in a ground for exploration and production of a hydrocarbon well. Said threaded connection comprises;
- a pin member comprising an external shoulder, a pin nose and a tapered pin threaded portion located between the external shoulder and the pin nose,
- a box member comprising an internal shoulder, a box nose and a tapered box threaded portion located between the internal shoulder and the box nose, wherein
  - the pin threaded portion and the box threaded portion are configured to engage each other during rotational make-up of the threaded connection,
  - the pin threaded portion and the box threaded portion comprise hooked threads providing radial interference between crests of the pin threaded portion and roots of the box threaded portion and/or between crests of the box threaded portion and roots of the pin threaded portion at final make-up of the threaded connection,
  - facing load flanks of the hooked threads of the pin threaded portion and the box threaded portion are in contact with each other at final make-up of the threaded connection,
  - facing stab flanks of the hooked threads of the pin threaded portion and the box threaded portion are located at a flank distance from each other at final make-up of the threaded connection,
  - the threaded connection is at final make-up free from any seal located between the engaged pin and box threaded portions and the pin nose,
  - the box nose is in contact with the external shoulder at final make-up of the threaded connection, and
  - the pin nose is located at an internal shoulder distance from the internal shoulder at final make-up of the threaded connection.

The threaded connection is configured to have the box nose in contact with the external shoulder at final make-up. This allows that one can determine during rotational make-up of the threaded connection when final make-up is achieved by checking if the box nose is in contact with the external shoulder. This is an effective and efficient way to determine when the final make-up of the threaded connection is reached.

For threaded connections that will be hammered it is very important that the correct configuration of final make-up is reached in order to ensure the impact forces induced by hammering are transferred along the correct path from the pin member to the box member. If the threaded connection is hammered into the ground without having the external shoulder and the box nose in contact with each other, the impact forces created during hammering would primarily be transferred from the pin member to the box member via the engaged pin and box threaded portions. This creates a high risk that the pin and box threaded portions are damaged by for example galling and plastic deformation.

In use, the tubular members which are interconnected via the threaded connection are hammered into the ground after final make-up of the threaded connection has been reached. As mentioned, this is to ensure that the impact forces induced by hammering are transferred along the correct path from the pin member to the box member. The pin member is positioned on top of the box member during the hammering. In said situation, the impact forces are primarily transferred from the pin member to the box member via the external shoulder and the box nose being in contact with each other. The fact that the impact forces induced by the hammering first move through the external shoulder being in contact with the box nose provides a relevant degree of protection against the impact forces for the engaged pin and box threaded portions.

The effects with respect to the impact forces on the threaded connection are further improved by the fact that at final make-up facing stab flanks of the hooked threads of the pin threaded portion and the box threaded portion are located at a flank distance from each other at final make-up of the threaded connection and that there is radial interference between crests and roots of the pin and box threaded portions. The flank distance between stab flanks allows that the pin and box threaded portions can move over some distance relative to each other under the impact forces of the hammering. This movement between the pin and box threaded portions together with the friction forces created by the radial interference and acting against said movement forms an energy absorption buffer to absorb energy from the impact forces before facing stab flanks come in contact.

The threaded connection is configured to have the pin nose located at an internal shoulder distance from the internal shoulder at final make-up. This ensures that the impact forces of the hammering are primarily transferred through the threaded connection at the increased radial distance of the first external shoulder surface and the first box nose surface.

The impact forces induced by hammering create shock waves which move through the threaded connection. A shock wave first creates compression and subsequently tension in the threaded connection. The engaged pin and box threaded portions are the only parts in the threaded connection which take up the tensile forces in the threaded connection. The hooked threads with their facing load flanks being in contact with each other at final make-up ensure that the threaded connection is able to withstand the tension created by the shock waves. In addition, the hooked threads help to maintain contact between the external shoulder and the box nose when the shock waves move through the threaded connection.

In an embodiment of the threaded connection,
the threaded connection defines a central axis at final make-up of the threaded connection,
the external shoulder comprises a first external shoulder surface, a second external shoulder surface, and a shoulder retainer surface,
the first external shoulder surface is located at a first radial shoulder distance from the central axis and at a first axial shoulder distance from the pin threaded portion,
the second external shoulder surface is located at a second radial shoulder distance from the central axis and at a second axial shoulder distance from the pin threaded portion,
the first radial shoulder distance is larger than the second radial shoulder distance,
the first axial shoulder distance is smaller than the second axial shoulder distance,
the shoulder retainer surface is located between the first external shoulder surface and the second external shoulder surface,
the box nose comprises a first box nose surface, a second box nose surface, and a box retainer surface,
the first box nose surface is located at a first radial box distance from the central axis and at a first axial box distance from the box threaded portion,
the second box nose surface is located at a second radial box distance from the central axis and at a second axial box distance from the box threaded portion,
the first radial box distance is larger than the second radial box distance,
the first axial box distance is smaller than the second axial box distance,
the box retainer surface is located between first box nose surface and the second box nose surface,
the first external shoulder surface and the first box nose surface are in contact with each other at final make-up of the threaded connection,
the second box nose surface is located at an external shoulder distance from the second external shoulder surface at final make-up of the threaded connection, and
the shoulder retainer surface and the box retainer surface are facing each other at final make-up of the threaded connection.

The first external shoulder surface and the first box nose surface are in contact with each other, and the second box nose surface is located at an external shoulder distance from the second external shoulder surface at final make-up of the threaded connection. Due to the fact that the first external shoulder surface and the first box nose surface are located at a larger radial distance from the threaded portions than the second external shoulder surface and the second box nose surface, the impact forces are transferred through the threaded connection at an increased radial distance from the threaded portions. This provides a further degree of protection for the engaged threaded portions against the impact forces.

The threaded connection is at final make-up free from any seal (e.g. a metal-to-metal seal or elastomeric seal) located between the engaged threaded portions and the pin nose. A seal located between the engaged threaded portions and the pin nose is typically provided to protect a threaded connection against damage created by overpressure inside the threaded connection.

The shoulder retainer surface and the box retainer surface provide a further protection against damage created by overpressure inside the threaded connection. The shoulder retainer surface and the box retainer surface protect against deformation due to overpressure inside the threaded connection by locking the box nose and preventing displacement outwards. Preventing radial movement of the box nose away from the central axis is very relevant to maintain the structural integrity of the threaded connection required for hammering. In addition, such radial movement of the box nose may damage the last engaged teeth of the engaged threaded portions.

In an embodiment of the threaded connection, the complete first external shoulder surface is located at a larger radial distance from the central axis than the second external shoulder surface, the complete first external shoulder surface is located at a smaller axial distance from the pin threaded portion than the second external shoulder surface, the complete first box nose surface is located at a larger radial distance from the central axis than the second box nose surface and the complete first box nose surface is located at a smaller axial distance from the box threaded portion than the second box nose surface.

In an embodiment of the threaded connection, the shoulder retainer surface is located between the first external shoulder surface and the second external shoulder surface when seen in axial direction along the central axis and when seen in radial direction relative to the central axis and the box retainer surface is located between the first box nose surface and the second box nose surface when seen in axial direction along the central axis and when seen in radial direction relative to the central axis.

In an embodiment of the threaded connection, the first external shoulder surface and the first box nose surface extend perpendicular to the central axis of the threaded connection. This facilitates that the structural integrity of the threaded connection is maintained when the first external shoulder surface and the first box nose surface being in contact with each other at final make-up transfer forces during hammering.

In an embodiment of the threaded connection, the first external shoulder surface extends under an angle $\lambda_1$ of 90 degrees relative to the central axis of the threaded connection, and the first box nose surface extends under an angle $\delta_1$ of 90 degrees relative to the central axis of the threaded connection.

In an embodiment of the threaded connection, the second external shoulder surface and the second box nose surface extend perpendicular to the central axis of the threaded connection. This facilitates that the structural integrity of the threaded connection is maintained in the situation that the second external shoulder surface and the second box nose surface come in contact with each other during hammering.

In an embodiment of the threaded connection, the second external shoulder surface extends under an angle $\lambda_2$ of 90 degrees relative to the central axis of the threaded connection, and the second box nose surface extends under an angle $\delta_2$ of 90 degrees relative to the central axis of the threaded connection.

In an embodiment of the threaded connection, the first external shoulder surface and the first box nose surface have an axial interference smaller than, or equal to, 0.2 mm at final make-up of the threaded connection. Said axial interference is measured in axial direction along the central axis of the threaded connection. Said axial interference may be larger than 0 and smaller than, or equal to, 0.2 mm at final make-up of the threaded connection. Said axial interference may be between, and including, 0.01 mm and 0.1 mm. Said axial interference is preferably (about) 0.05 mm.

In an embodiment of the threaded connection, the external shoulder distance between the second external shoulder surface and the second box nose surface is smaller than, or equal to, 0.3 mm at final make-up of the threaded connection. Said external shoulder distance is measured in axial direction along the central axis of the threaded connection. Said external shoulder distance may be larger than 0 mm and smaller than, or equal to, 0.3 mm at final make-up of the threaded connection. Said external shoulder distance may be between, and including, 0.02 mm and 0.2 mm. Said external shoulder distance is preferably (about) 0.1 mm.

In an embodiment of the threaded connection, the shoulder retainer surface extends under an angle $\phi$ of between, and including, 5 degrees and 11 degrees relative to the central axis of the threaded connection, and the box retainer surface extends under an angle $\epsilon$ of between, and including, 5 degrees and 11 degrees relative to the central axis of the threaded connection. This configuration of the shoulder retainer surface and the box retainer surface facilitates the make-up process of the threaded connection. The angle $\phi$ and the angle $\epsilon$ may be (substantially) equal to each other. The shoulder retainer surface extends preferably under an angle $\phi$ of (about) 8 degrees relative to the central axis of the threaded connection. The box retainer surface extends preferably under an angle $\epsilon$ of (about) 8 degrees relative to the central axis of the threaded connection.

In an embodiment of the threaded connection, the shoulder retainer surface and the box retainer surface are configured to block radial movement of the box nose away from the central axis.

In an embodiment of the threaded connection, the threaded connection is at final make-up free from any seal located between the engaged pin and box threaded portions and the box nose.

In an embodiment of the threaded connection, the pin member comprises an internal pin guiding surface located between the pin threaded portion and the pin nose and an external pin guiding surface located between the pin threaded portion and the external shoulder, the box member comprises an internal box guiding surface located between the box threaded portion and the internal shoulder and an external box guiding surface located between the box threaded portion and the box nose, the internal pin guiding surface and the internal box guiding surface are configured to move along each other during make-up and are facing each other at final make-up, and the external pin guiding surface and the external box guiding surface are configured to move along each other during make-up and are facing each other at final make-up.

In an embodiment of the threaded connection, the box member comprises an outer box connector surface and the first box nose surface extends until or adjacent to the outer box connector surface.

In an embodiment of the threaded connection, the pin member comprises an outer pin connector surface and the first external shoulder surface extends until or adjacent to the outer pin connector surface.

In an embodiment of the threaded connection, the radial interference between crests of the pin threaded portion and roots of the box threaded portion and/or between crests of the box threaded portion and roots of the pin threaded portion at final make-up of the threaded connection is less than 0.25 mm, in particular less than 0.2 mm, even more in particular between, and including, 0.05 mm and 0.15 mm. Said radial interference is preferably 0.1 mm.

In an embodiment of the threaded connection, the threaded connection is configured to have the pin nose and the internal shoulder in contact with each other while the facing stab flanks are not in contact with each other at final make-up and under a predetermined compressive force working on the threaded connection in a direction of the central axis.

In an embodiment of the threaded connection, the facing stab flanks are more spaced from each other than the pin nose and internal shoulder when seen along the central axis.

In an embodiment of the threaded connection, the internal shoulder distance is larger than 0 mm and smaller than 0.3 mm at final make-up of the threaded connection. Preferably, the internal shoulder distance is larger than 0 mm and smaller than 0.24 mm at final make-up of the threaded connection. The internal shoulder distance is measured in axial direction along the central axis of the threaded connection.

In an embodiment of the threaded connection, the flank distance is between, and including, 0.1 and 0.25 mm at final make-up of the threaded connection. The flank distance is measured in axial direction along the central axis of the threaded connection.

In an embodiment of the threaded connection, the pin member comprises a pin member inner surface, the box member comprises a box member inner surface, and the pin member inner surface and the box member inner surface extend flush to each other at final make-up of the threaded connection.

In an embodiment of the threaded connection, the pin member inner surface and the box member inner surface are both located at an inner member surface radius R1 from the central axis.

In an embodiment of the threaded connection;
the pin member comprises a pin pipe part having a pin pipe part outer surface located at a pin pipe part outer surface radius R2 from the central axis,
the pin member comprises a pin member shoulder section which forms the external shoulder and is located between the pin pipe part and the pin threaded portion,
the pin member comprise a pin connector part extending from the pin member shoulder section until the pin nose,
the box member comprises a box pipe part having a box pipe part outer surface located at a box pipe part outer surface radius R3 from the central axis, the box member comprises a box member shoulder section which forms the internal shoulder and is located between the box pipe part and the box threaded portion, the box member comprise a box connector part extending from the box member shoulder section until the box nose, at final make-up, the pin connector part and the box connector part define together an outer connector surface located at an outer connector radius R4 from the central axis, and the outer connector radius R4 is larger than each of the pin pipe part outer surface radius R2 and the box pipe part outer surface radius R3.

In an embodiment of the threaded connection, the outer connector radius R4 is between, and including, R2+13 mm and R2+19 mm.

In an embodiment of the threaded connection, the outer connector radius R4 is between, and including, R3+13 mm and R3+19 mm.

In an embodiment of the threaded connection, the pin pipe part outer surface radius R2 is equal to the box pipe part outer surface radius R3.

In an embodiment of the threaded connection;

a pin transition area having a pin transition radius R5 is located between the pin pipe part outer surface and the outer connector surface, a box transition area having a box transition radius R6 is located between the box pipe part outer surface and the outer connector surface, and the pin transition radius R5 is equal to or larger than the box transition radius R6.

In an embodiment of the threaded connection, the pin transition radius R5 is between, and including, 2 mm and 20 mm and the box transition radius R6 is between, and including, 2 mm and 8 mm.

In an embodiment of the threaded connection, the pin member and the box member comprise a single step thread formed by the pin threaded portion and box threaded portion, respectively.

In an embodiment of the threaded connection, the pin and box threaded portions extend under a taper angle α between, and including, 6 degrees and 11 degrees relative to the central axis.

In an embodiment of the threaded connection, the pin threaded portion and the box threaded portion comprise multi threads which are configured to be made-up by rotational make-up over between, and including, 180 degrees and 360 degrees.

In an embodiment of the threaded connection, the internal shoulder comprises an internal stop surface facing a pin nose stop surface of the pin nose and located at the internal shoulder distance at final make-up, and the internal stop surface and the pin nose stop surface extend under a stop angle β of between, and including, 4 degrees and 12 degrees relative to the central axis of the threaded connection.

In an embodiment of the threaded connection, the threaded connection is configured to reach final make-up when contact between the first box nose surface and the first external shoulder surface is achieved during rotational make-up.

In an embodiment of the threaded connection, the threaded connection is configured to be hammered into the ground after final make-up has been reached and with the pin member positioned on top of the box member during the hammering.

In an embodiment of the threaded connection, the pin member comprises a pin pipe part having a pin pipe part outer surface located at a pin pipe part outer surface radius R2 from the central axis and 2×R2 is between, and including, 508 mm and 1016 mm (between, and including, 20 inch and 40 inch).

In an embodiment of the threaded connection, the box member comprises a box pipe part having a box pipe part outer surface located at a box pipe part outer surface radius R3 from the central axis and 2×R3 is between, and including, 508 mm and 1016 mm (between, and including, 20 inch and 40 inch).

In an embodiment of the threaded connection, the threaded connection is configured to interconnect tubular members having an outer diameter between, and including, 508 mm and 1016 mm (between, and including 20 inch and 40 inch).

It will be clear to the skilled person that embodiments of the threaded connection according to the invention may be formed by combining the features of any number of the above defined embodiments of the threaded connection.

The invention further relates to a method for hammering interconnected tubular members into a ground, such as onshore land, for exploration and production of a hydrocarbon well, said tubular members being interconnected via a threaded connection according to the invention, wherein the method comprises hammering the interconnected tubular members after final make-up of the threaded connection has been reached and with the pin member positioned on top of the box member during the hammering.

BRIEF DESCRIPTION OF THE INVENTION

Figure 1D:
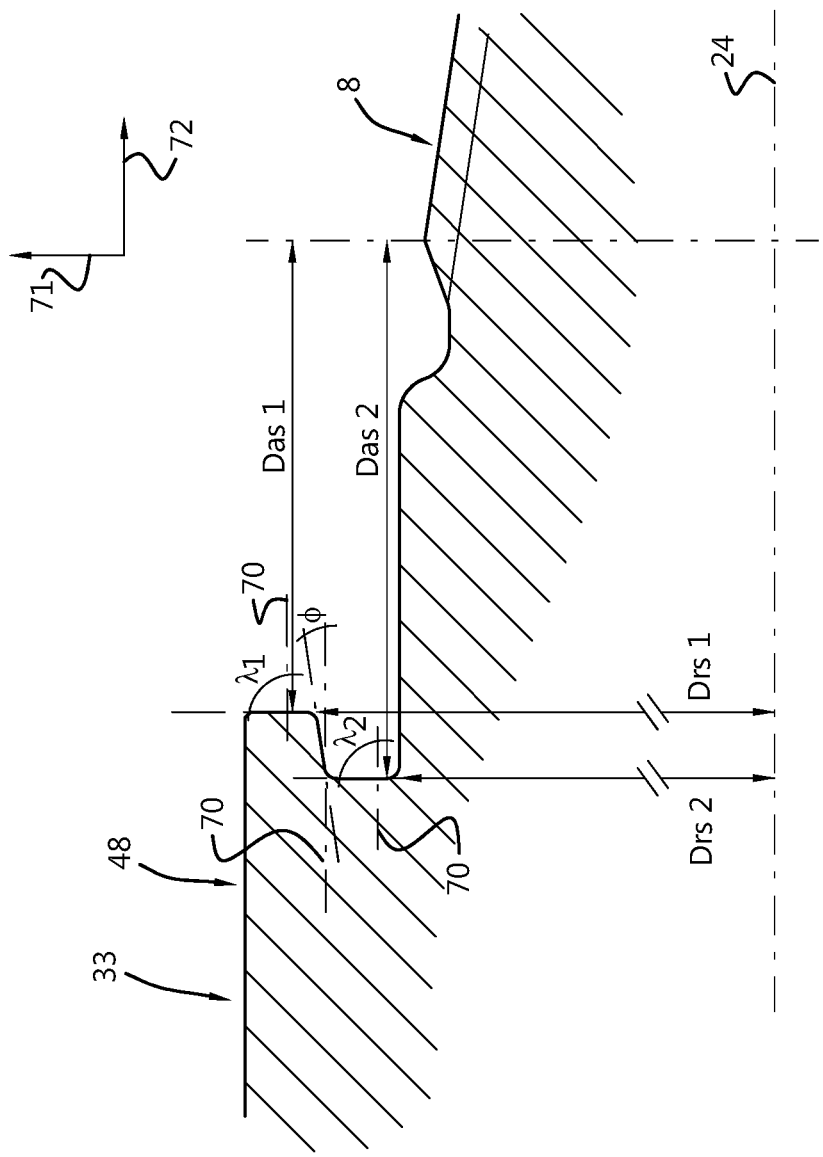
Figure 1E:
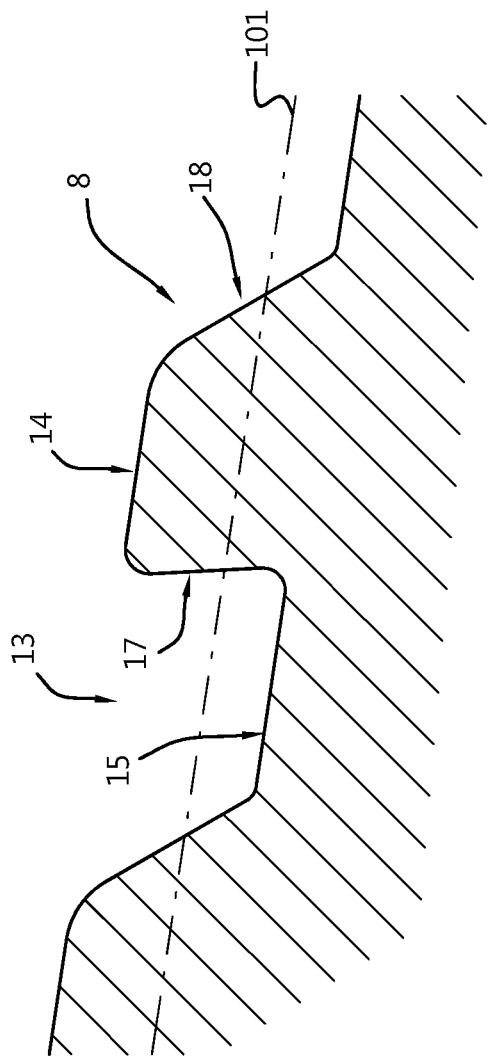
Figure 2B:
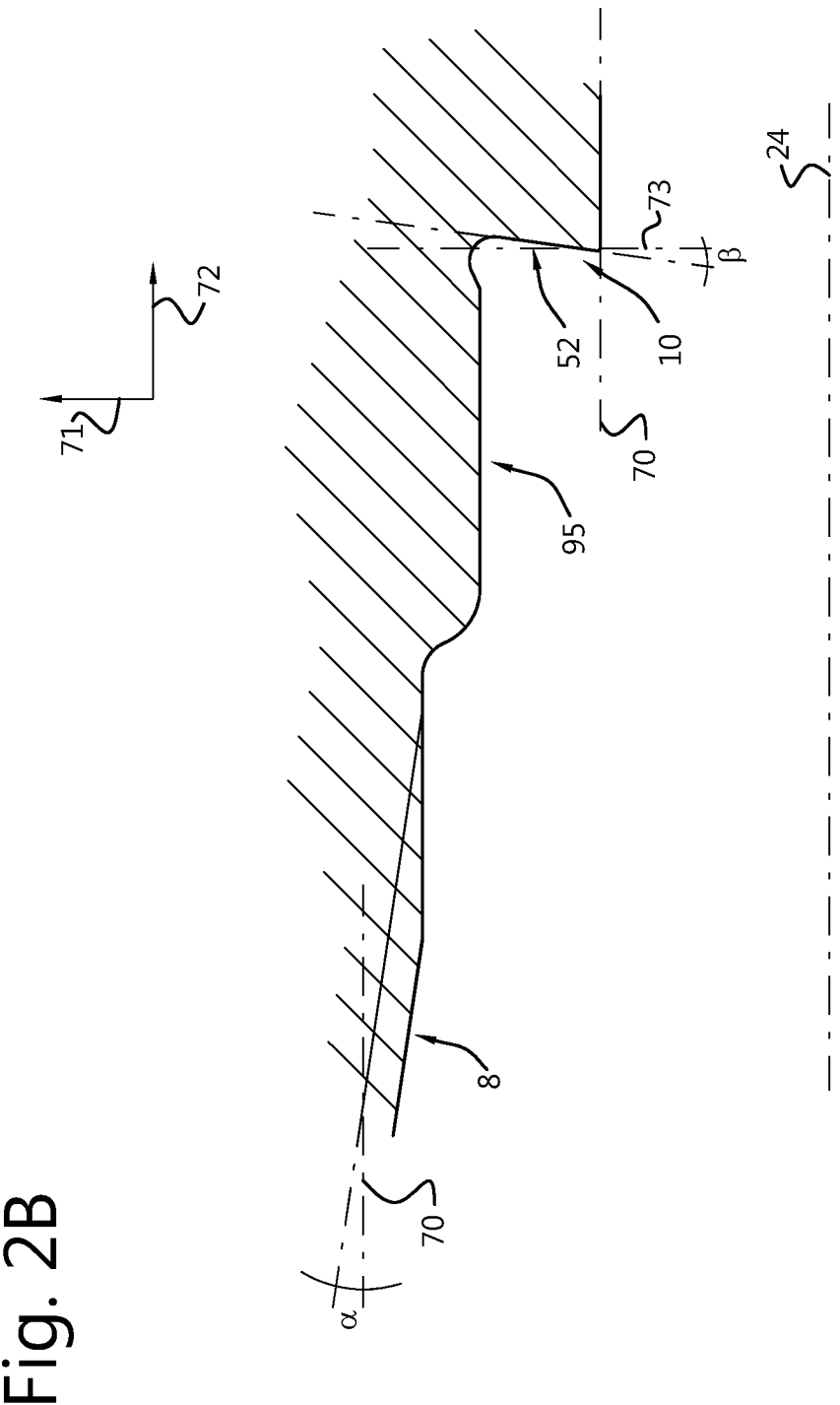
Figure 2E:
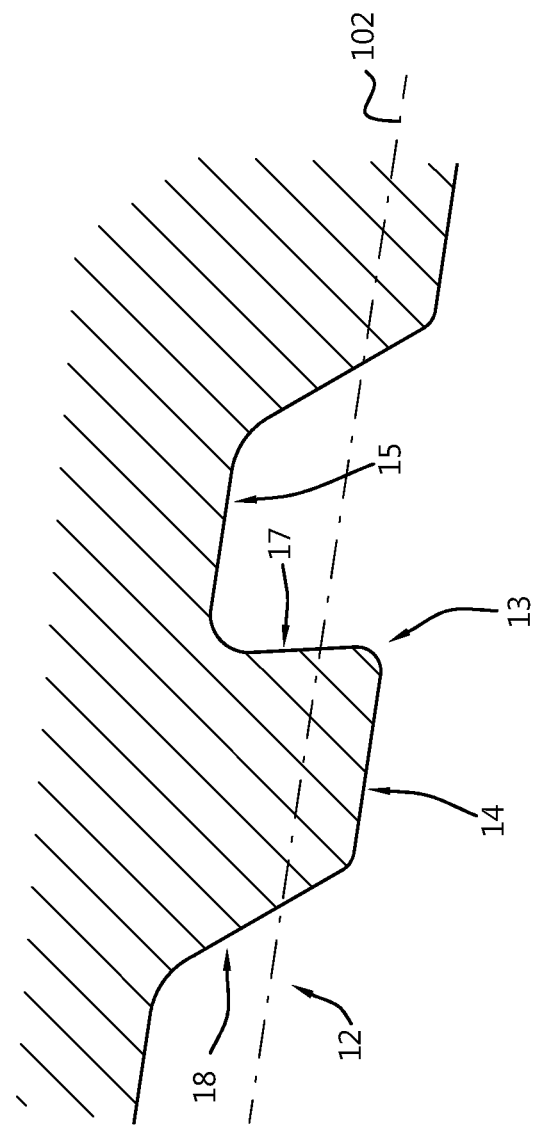
Figure 3A:
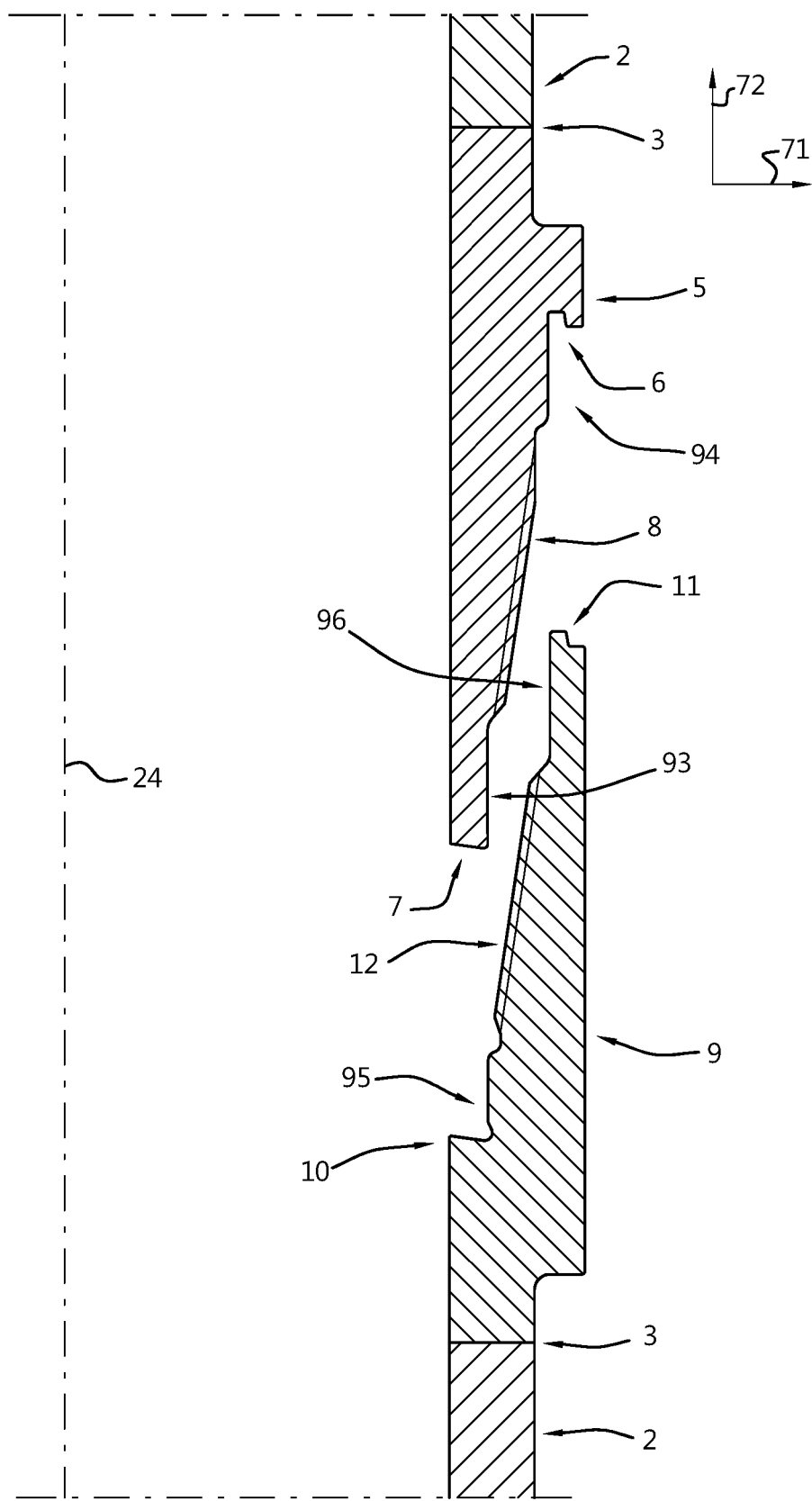
Figure 3B:
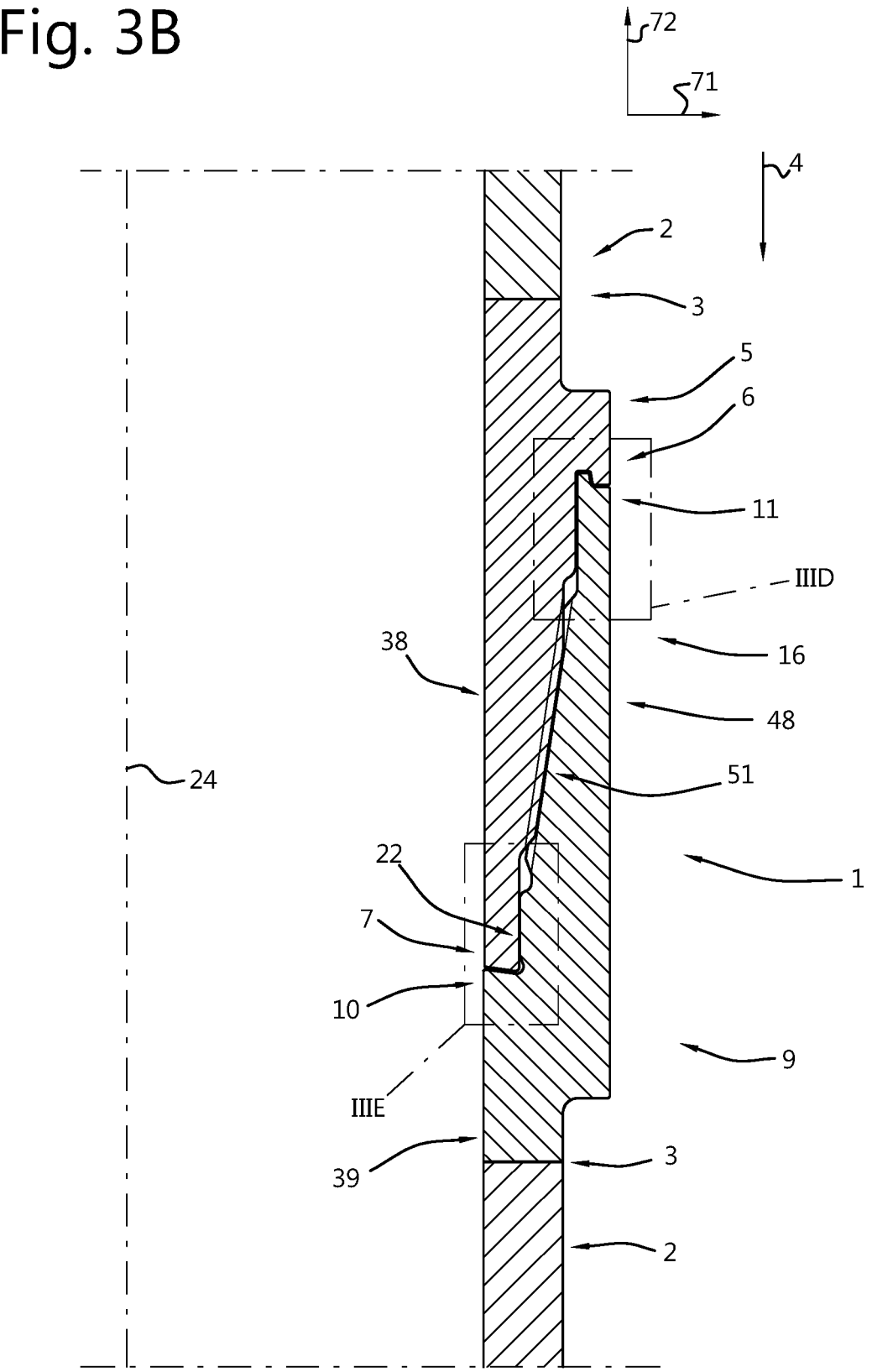
Figure 3E:
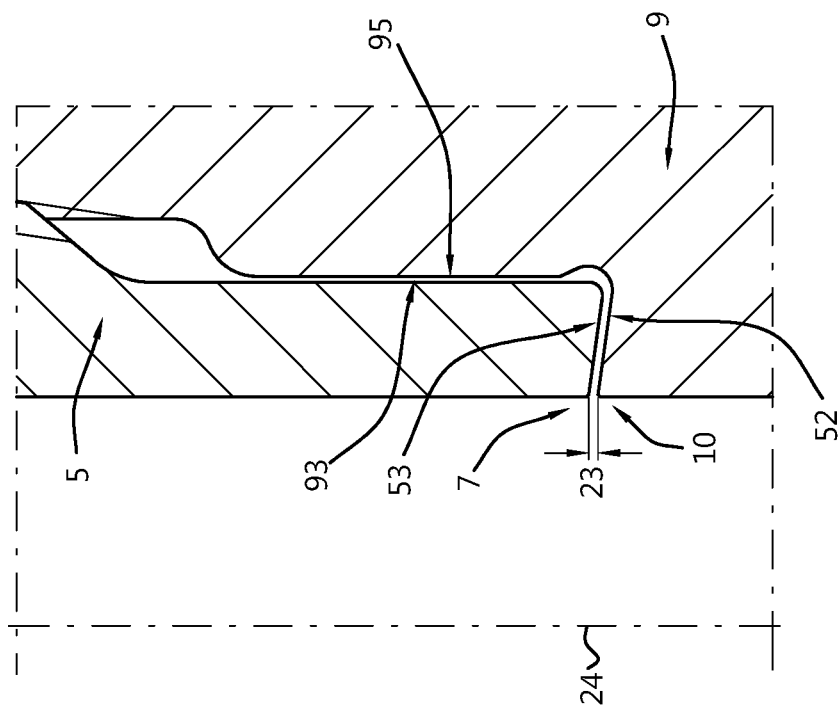
Figure 3D:
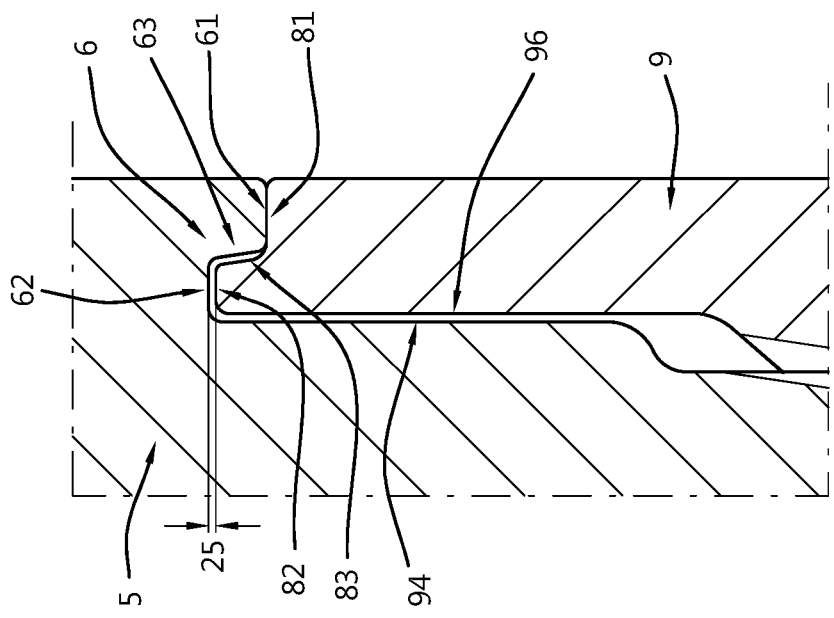
Figure 3F:
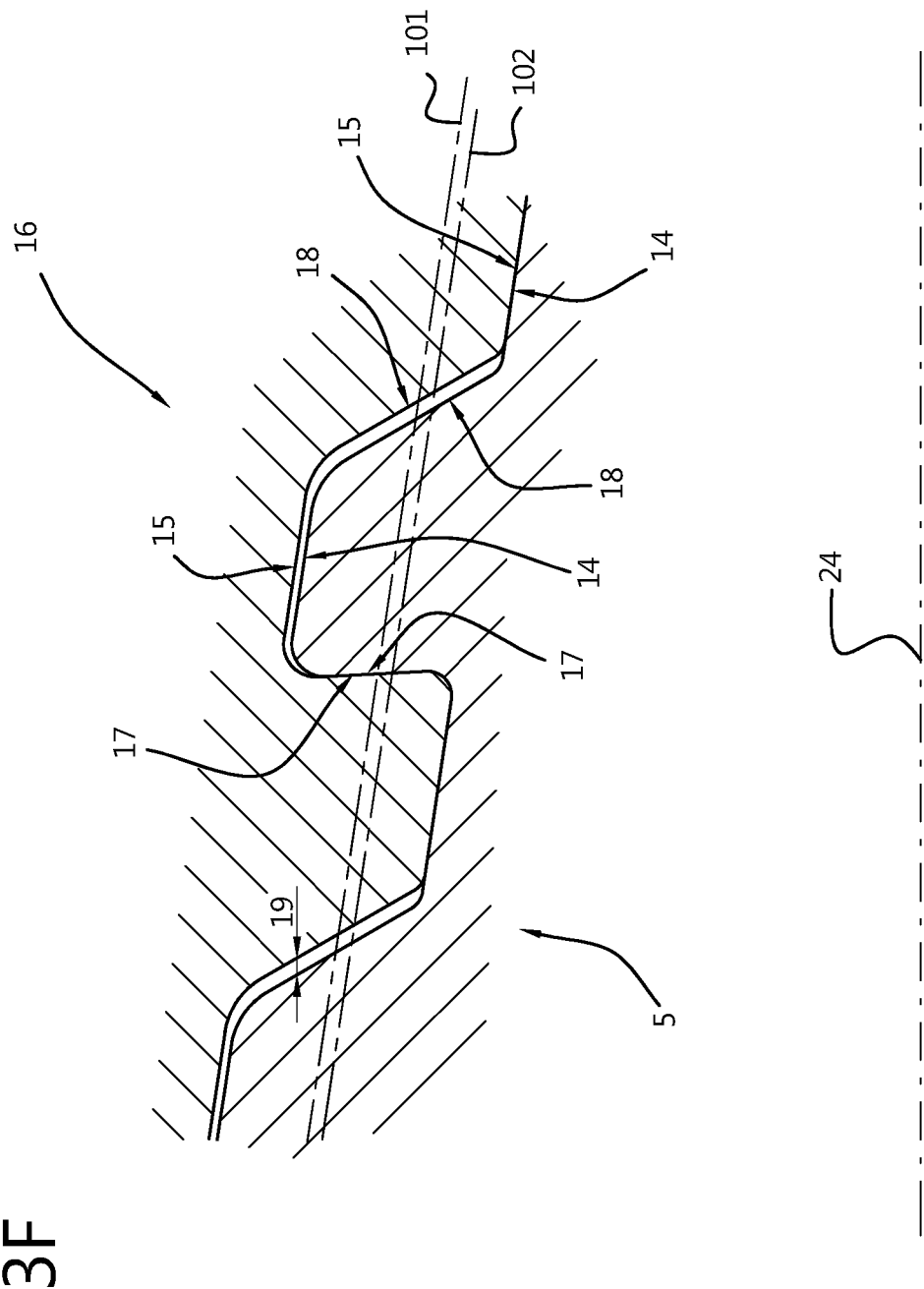

Embodiments of the threaded connection and the method according to the invention will be described by way of example only, with reference to the accompanying schematic drawings in which corresponding reference symbols indicate corresponding parts, and in which:

FIG. 1A schematically shows a cross sectional view of an embodiment of a pin member of a threaded connection according to the invention, FIG. 1B schematically shows an enlarged view of part of the pin threaded portion and the pin nose of the pin member of FIG. 1A, the FIGS. 1C and 1D schematically show the same enlarged view of part of the pin threaded portion and the external shoulder of the pin member of FIG. 1A, FIG. 1E schematically shows a further enlarged view of part of the pin threaded portion of the pin member of FIG. 1A, FIG. 2A schematically shows a cross sectional view of an embodiment of a box member of a threaded connection according to the invention, FIG. 2B schematically shows an enlarged view of part of the box threaded portion and the internal shoulder of the box member of FIG. 2A, the FIGS. 2C and 2D schematically show the same enlarged view of part of the box threaded portion and the box nose of the box member of FIG. 2A, FIG. 2E schematically shows a further enlarged view of part of the box threaded portion of the box member of FIG. 2A, FIG. 3A schematically shows a cross sectional view of the pin member of the FIGS. 1A-E and the box member of the FIGS. 2A-E connected to tubular members, FIG. 3B schematically shows a cross sectional view of an embodiment of the threaded connection according to the invention and comprising the pin member and the box member of FIG. 3A, FIG. 3C schematically shows an enlarged view of the engaged pin threaded portion and box threaded portion of the threaded connection of FIG. 3B, FIG. 3D schematically shows an enlarged view of the external shoulder and the box nose of the threaded connection of FIG. 3B, FIG. 3E schematically shows an enlarged view of the internal shoulder and the pin nose of the threaded connection of FIG. 3B, and FIG. 3F schematically shows an alternative embodiment of the engaged pin threaded portion and box threaded portion of the threaded connection of FIG. 3B.

DETAILED DESCRIPTION OF THE INVENTION

An embodiment of the threaded connection 1 according to the invention is shown in the FIGS. 3A-E. Said threaded connection 1 comprises the pin member 5 shown in the FIGS. 1A-E and the box member 9 shown in the FIGS. 2A-E. The threaded connection 1 is configured for hammering interconnected tubular members 2 into a ground, such as onshore land, for exploration and production of a hydrocarbon well.

The FIGS. 1A-E show cross sectional views of the pin member 5 of the threaded connection 1. The pin member 5 comprises an external shoulder 6, a pin nose 7 and a tapered pin threaded portion 8 located between the external shoulder 6 and the pin nose 7 when seen along the central axis 24.

The external shoulder 6 comprises a first external shoulder surface 61, a second external shoulder surface 62, and a shoulder retainer surface 63. The first external shoulder surface 61 is located at a first radial shoulder distance Drs1 from the central axis 24 and at a first axial shoulder distance Das1 from the pin threaded portion 8 (see FIG. 1D). The second external shoulder surface 62 is located at a second radial shoulder distance Drs2 from the central axis 24 and at a second axial shoulder distance Das2 from the pin threaded portion 8. The first radial shoulder distance Drs1 is larger than the second radial shoulder distance Drs2. The first axial shoulder distance Das1 is smaller than the second axial shoulder distance Das2. The complete first external shoulder surface 61 is located at a larger radial distance from the central axis 24 than the second external shoulder surface 62, the complete first external shoulder surface 61 is located at a smaller axial distance from the pin threaded portion 8 than the second external shoulder surface 62.

The shoulder retainer surface 63 is located between the first external shoulder surface 61 and the second external shoulder surface 62. The shoulder retainer surface 63 is located between the first external shoulder surface 61 and the second external shoulder surface 62 when seen in axial direction along the central axis 24 and when seen in radial direction relative to the central axis 24.

The FIGS. 2A-E show cross sectional views of the box member 9 of the threaded connection 1. The box member 9 comprises an internal shoulder 10, a box nose 11 and a tapered box threaded portion 12 located between the internal shoulder 10 and the box nose 11 when seen along the central axis 24.

The box nose 11 comprises a first box nose surface 81, a second box nose surface 82, and a box retainer surface 83. The first box nose surface 81 is located at a first radial box distance Drb1 from the central axis 24 and at a first axial box distance Dab1 from the box threaded portion 12 (see FIG. 2D). The second box nose surface 82 is located at a second radial box distance Drb2 from the central axis 24 and at a second axial box distance Dab2 from the box threaded portion 12. The first radial box distance Drb1 is larger than the second radial box distance Drb2. The first axial box distance Dab1 is smaller than the second axial box distance Dab2. The complete first box nose surface 81 is located at a larger radial distance from the central axis 24 than the second box nose surface 82 and the complete first box nose surface 81 is located at a smaller axial distance from the box threaded portion 12 than the second box nose surface 82.

The box retainer surface 83 is located between first box nose surface 81 and the second box nose surface 82. The box retainer surface 83 is located between the first box nose surface 81 and the second box nose surface 82 when seen in axial direction along the central axis 24 and when seen in radial direction relative to the central axis 24.

The first external shoulder surface 61 and the first box nose surface extend 81 perpendicular to the central axis 24 of the threaded connection 1. This facilitates that the structural integrity of the threaded connection 1 is maintained when the first external shoulder surface 61 and the first box nose surface 81 being in contact with each other at final make-up 16 transfer forces during hammering.

The second external shoulder surface 62 and the second box nose surface 82 extend perpendicular to the central axis 24 of the threaded connection 1. This facilitates that the structural integrity of the threaded connection 1 is maintained in the situation that the second external shoulder surface 62 and the second box nose surface 82 come in contact with each other during hammering.

The FIGS. 1D and 2D show that the first external shoulder surface 61 extends under an angle $\lambda_1$ of 90 degrees relative to the central axis 24, the first box nose surface 81 extends under an angle $\delta_1$ of 90 degrees relative to the central axis 24, the second external shoulder surface 62 extends under an angle $\lambda_2$ of 90 degrees relative to the central axis 24, and the second box nose surface 82 extends under an angle $\delta_2$ of 90 degrees relative to the central axis 24. The angles $\lambda_1$, $\lambda_2$, $\delta_1$, and $\delta_2$ are shown relative to virtual parallel lines 70 extending parallel to the central axis 24.

The shoulder retainer surface 63 extends under an angle $\phi$ of between, and including, 5 degrees and 11 degrees relative to the central axis 24 of the threaded connection 1. The angle $\phi$ is in FIG. 1D shown relative to a virtual parallel line 70 extending parallel to the central axis 24. The box retainer surface 83 extends under an angle $\varepsilon$ of between, and including, 5 degrees and 11 degrees relative to the central axis 24 of the threaded connection 1. The angle $\varepsilon$ is in FIG. 2D shown relative to a virtual parallel line 70 extending parallel to the central axis 24.

The pin threaded portion 8 and the box threaded portion 12 are configured to engage each other during rotational make-up of the threaded connection 1 (see FIG. 3B). The pin threaded portion 8 (see FIG. 1E) and the box threaded portion 12 (see FIG. 2E) comprise hooked threads 13 providing radial interference between crests 14 of the pin threaded portion 8 and roots 15 of the box threaded portion 12 and between crests 14 of the box threaded portion 12 and roots 15 of the pin threaded portion 8 at final make-up 16 of the threaded connection 1 (see FIG. 3C).

In an alternative embodiment of the threaded connection 1 according the invention, the hooked threads 13 provide at final make-up 16 radial interference only between crests 14 of the pin threaded portion 8 and roots 15 of the box threaded portion 12 or only between crests 14 of the box threaded portion 12 and roots 15 of the pin threaded portion 8. The latter alternative embodiment is shown in FIG. 3F. Said embodiment comprises a clearance between the between crests 14 of the pin threaded portion 8 and roots 15 of the box threaded portion 12.

Hooked threads 13 have a positive stab flank angle at the stab flanks 18 and a negative load flank angle at the load flanks 17. Facing load flanks 17 of the hooked threads 13 of the pin threaded portion 8 and the box threaded portion 12 are in contact with each other and facing stab flanks 18 of the hooked threads 13 of the pin threaded portion 8 and the box threaded portion 12 are located at a flank distance 19 from each other at final make-up 16 of the threaded connection 1 (see FIG. 3C).

The pin member 5 comprises an internal pin guiding surface 93 located between the pin threaded portion 8 and the pin nose 7 and an external pin guiding surface 94 located between the pin threaded portion 8 and the external shoulder 6. The internal pin guiding surface 93 is provided at a pin lip section 31 of the pin member 5.

The box member 9 comprises an internal box guiding surface 95 located between the box threaded portion 12 and the internal shoulder 10 and an external box guiding surface 96 located between the box threaded portion 12 and the box nose 11. The external box guiding surface 96 is provided at a box lip section 30 of the box member 9.

The internal pin guiding surface 93 and the internal box guiding surface 95 are configured to move along each other during make-up and are facing each other at final make-up 16. The external pin guiding surface 94 and the external box guiding surface 96 are configured to move along each other during make-up and are facing each other at final make-up 16.

The threaded connection 1 is at final make-up 16 free from any seal located between the engaged pin and box threaded portions 8 and 12 and the pin nose 7. The seal-free zone is indicated by reference number 22. In the shown embodiment, the threaded connection 1 is at final make-up 16 also free from any seal located between the engaged pin and box threaded portions 8 and 12 and the box nose 11.

The box nose 11 is in contact with the external shoulder 6 at final make-up 16 of the threaded connection 1 (see FIG. 3D). The first external shoulder surface 61 and the first box nose surface 81 are in contact with each other at final make-16 up of the threaded connection 1. The second box nose surface 82 is located at an external shoulder distance 25 from the second external shoulder surface 62 at final make-up 16 of the threaded connection 1.

The fact that the threaded connection 1 is configured to have the box nose 11, more specifically the first box nose surface 81, in contact with the external shoulder 6, more specifically the first external shoulder surface 61, at final make-up 16 allows that one can determine during rotational make-up of the threaded connection 1 when final make-up 16 is achieved by checking if the box nose 11 is in contact with the external shoulder 6. This is an effective and efficient way to determine when the final make-up 16 of the threaded connection 1 is reached. Said checking may be performed by using a suitable feeler gauge.

For threaded connections 1 that will be hammered it is very important that the correct configuration of final make-up 16 is reached in order to ensure the impact forces induced by hammering are transferred along the correct path from the pin member 5 to the box member 9. If the threaded connection 1 is hammered into the ground without having the external shoulder 6 and the box nose 11 in contact with each other, the impact forces created during hammering would primarily be transferred from the pin member 5 to the box member 9 via the engaged pin and box threaded portions 8 and 12. This creates a high risk that the pin and box threaded portions 8 and 12 are damaged by for example galling and plastic deformation. In use, the tubular members which are interconnected via the threaded connection 1 are hammered into the ground after final make-up 16 of the threaded connection 1 has been reached. As mentioned, this is to ensure that the impact forces induced by hammering are transferred along the correct path from the pin member 5 to the box member 9. The pin member 5 is positioned on top of the box member 9 during the hammering. In said situation, the impact forces are primarily transferred from the pin member 5 to the box member 9 via the external shoulder 6 and the box nose 11 being in contact with each other. The fact that the impact forces induced by the hammering first move through the external shoulder 6 being in contact with the box nose 11 provides a relevant degree of protection against the impact forces for the engaged pin and box threaded portions 8 and 12.

Due to the fact that the first external shoulder surface 61 and the first box nose surface 81 are located at a larger radial distance from the threaded portions 8 and 12 than the second external shoulder surface 62 and the second box nose surface 82, the impact forces during hammering are transferred through the threaded connection 1 at an increased radial distance from the threaded portions 8 and 12. This provides a further degree of protection for the engaged threaded portions 8 and 12 against the impact forces.

The shoulder retainer surface 63 and the box retainer surface 83 are facing each other at final make-up 16 of the threaded connection 1. The shoulder retainer surface 63 and the box retainer surface 83 are configured to block radial movement of the box nose 11 away from the central axis 24. The shoulder retainer surface 63 and the box retainer surface 83 provide a further protection against damage created by overpressure inside the threaded connection 1. The shoulder retainer surface 63 and the box retainer surface 83 protect against deformation due to overpressure inside the threaded connection 1 by locking the box nose 11 and preventing displacement outwards. Preventing radial movement of the box nose 11 away from the central axis 24 is very relevant to maintain the structural integrity of the threaded connection 1 required for hammering. In addition, such radial movement of the box nose 11 may damage the last engaged teeth of the engaged threaded portions 8 and 12.

The first external shoulder surface 61 and the first box nose surface 81 have an axial interference smaller than, or equal to, 0.2 mm at final make-up 16 of the threaded connection 1. The external shoulder distance 25 between the second external shoulder surface 62 and the second box nose surface 82 is smaller than, or equal to, 0.3 mm at final make-up 16 of the threaded connection 1. The external shoulder distance 25 is measured in axial direction along the central axis 24.

The pin nose 7 is located at an internal shoulder distance 23 from the internal shoulder 10 at final make-up 16 of the threaded connection 1 (see FIG. 3E). This ensures that the impact forces of the hammering are primarily transferred through the threaded connection 1 at the increased radial distance of the first external shoulder surface 61 and the first box nose surface 81. In FIG. 3B, the threaded connection 1 interconnects two tubular members 2 which are attached the pin member 5 and the box member 9 by welding seams 3. The horizontal direction 71 and vertical direction 72 are indicated. The threaded connection 1 is configured to be hammered into the ground after final make-up 16 has been reached and with the pin member 5 positioned on top of the box member 9 during the hammering. In said situation, the hammering will occur on the upper tubular member 2 in the direction shown by arrow 4 in FIG. 3B. The threaded connection 1 is configured to interconnect tubular members 2 having an outer diameter between, and including, 508 mm and 1016 mm (between, and including 20 inch and 40 inch).

The radial interference between crests 14 of the pin threaded portion 8 and roots 15 of the box threaded portion 12 and between crests 14 of the box threaded portion 12 and roots 15 of the pin threaded portion 8 at final make-up 16 of the threaded connection 1 is less than 0.25 mm, in particular less than 0.2 mm, even more in particular between, and including, 0.05 mm and 0.15 mm. Said radial interference is preferably 0.1 mm. The radial interference improves the function as energy absorption buffer of the engaged pin and box threaded portions 8 and 12.

The threaded connection 1 is configured to have the pin nose 7 and the internal shoulder 10 in contact with each other while the facing stab flanks 18 are not in contact with each other at final make-up 16 and under a predetermined compressive force working on the threaded connection 1 in a direction of the central axis 24.

When seen along the central axis 24, the facing stab flanks 18 are more spaced from each other than the pin nose 7 and the internal shoulder 10.

This way, the pin nose 7 and the internal shoulder 10 protect the engaged pin and box threaded portions 8 and 12 against undesired high impact forces during hammering.

Tests revealed that surprisingly good results were achieved when the internal shoulder distance 23 is larger than 0 mm and smaller than 0.3 mm at final make-up 16 of the threaded connection 1. Preferably, the internal shoulder distance 23 is larger than 0 mm and smaller than 0.24 mm at final make-up 16 of the threaded connection 1. These tests also indicated that surprisingly good results were achieved when the flank distance 19 is between, and including, 0.1 mm and 0.25 mm at final make-up 16 of the threaded connection 1. The internal shoulder distance 23 and the flank distance 19 are measured in axial direction along the central axis 24.

The pin member 5 comprises a pin member inner surface 38, the box member 9 comprises a box member inner surface 39, and the pin member inner surface 38 and the box member inner surface 39 extend flush to each other at final make-up 16 of the threaded connection 1 (see FIG. 3B).

The pin member inner surface 38 and the box member inner surface 39 are both located at an inner member surface radius R1 from the central axis 24 (see the FIGS. 1A and 2A).

The pin member 5 comprises a pin pipe part 40 having a pin pipe part outer surface 41 located at a pin pipe part outer surface 41 radius R2 from the central axis 24. The pin member 5 comprises a pin member shoulder section 33 which forms the external shoulder 6 and is located between the pin pipe part 40 and the pin threaded portion 8. The pin member 5 comprise a pin connector part 43 extending from the pin member shoulder section 33 until the pin nose 7. 2×R2 (R2 times two) is between, and including, 508 mm and 1016 mm (between, and including 20 inch and 40 inch).

The box member 9 comprises a box pipe part 44 having a box pipe part outer surface 45 located at a box pipe part outer surface radius R3 from the central axis 24. The box member 9 comprises a box member shoulder section 46 which forms the internal shoulder 10 and is located between the box pipe part 44 and the box threaded portion 12. The box member 9 comprise a box connector part 47 extending from the box member shoulder section 46 until the box nose 11. 2×R3 (R3 times two) is between, and including, 508 mm and 1016 mm (between, and including 20 inch and 40 inch).

At final make-up 16, the pin connector part 43 and the box connector part 47 define together an outer connector surface 48 located at an outer connector radius R4 from the central axis 24. The outer connector radius R4 is larger than each of the pin pipe part outer surface 41 radius R2 and the box pipe part outer surface radius R3.

The outer connector radius R4 is between, and including, R2+13 mm and R2+19 mm. The outer connector radius R4 is between, and including, R3+13 mm and R3+19 mm. The pin pipe part outer surface 41 radius R2 is equal to the box pipe part outer surface radius R3.

A pin transition area 49 having a pin transition radius R5 is located between the pin pipe part outer surface 41 and the outer connector surface 48. A box transition area 50 having a box transition radius R6 is located between the box pipe part outer surface 45 and the outer connector surface 48. The pin transition radius R5 is equal to the box transition radius R6. In other examples of the threaded connection according to the invention, the pin transition radius R5 may be larger than the box transition radius R6. The pin transition radius R5 is preferably between, and including, 2 mm and 20 mm and the box transition radius R6 is preferably between, and including, 2 mm and 8 mm.

The pin member 5 comprises an outer pin connector surface 55 and the first external shoulder surface 61 extends until or adjacent to the outer pin connector surface 55. The box member 9 comprises an outer box connector surface 56 and the first box nose surface 81 extends until or adjacent to the outer box connector surface 56. The outer pin connector surface 55 and the outer box connector surface 56 together form the outer connector surface 48.

The pin member 5 and the box member 9 comprise a single step thread 51 formed by the pin threaded portion 8 and box threaded portion 12, respectively. This means that no further steps of threads are provided on the threaded connection 1.

The pin and box threaded portion 8 and 12 extend preferably under a taper angle α between, and including, 6 degrees and 11 degrees relative to the central axis 24 (see the FIGS. 1B and 2B). The taper angle α is measured with respect the centre line 101 of the pin threaded portion 8 and the centre line 102 of the box threaded portion 12 (see the FIGS. 1E and 2E). The taper angle α is shown relative to a virtual parallel line 70 extending parallel to the central axis 24. In the hammering position of the threaded connection 1 shown in FIG. 3B, the virtual parallel line 70 extends in the vertical direction 72.

The pin threaded portion 8 and the box threaded portion 12 comprise multi threads which are configured to be made-up by rotational make-up over between, and including, 180 degrees and 360 degrees.

The internal shoulder 10 comprises an internal stop surface 52 facing a pin nose stop surface 53 of the pin nose 7 and located at the internal shoulder distance 23 at final make-up 16, and the internal stop surface 52 and the pin nose stop surface 53 extend preferably under a stop angle β of between, and including, 4 degrees and 12 degrees relative to a virtual perpendicular line 73 extending perpendicular to the central axis 24 of the threaded connection 1 (see the FIGS. 1B and 2B). In the hammering position of the threaded connection 1 shown in FIG. 3B, the virtual perpendicular line 73 extends in the horizontal direction 71.

The internal stop surface 52 and the pin nose stop surface 53 are inclined away from the external shoulder 6 when seen along the virtual perpendicular line 73 in a direction away from the central axis 24.

The stop angle β of the internal stop surface 52 and the pin nose stop surface 53 ensure that the pin nose 7 tends to move towards the box member 9 instead of away.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The terms multiple and plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the shown threaded connection and method according to the invention without departing from the scope as defined in the claims.

The invention claimed is:

1. A threaded connection for hammering interconnected tubular members into a ground, for exploration and production of a hydrocarbon well, said threaded connection comprising:
   a pin member comprising an external shoulder, a pin nose and a tapered pin threaded portion located between the external shoulder and the pin nose,
   a box member comprising an internal shoulder, a box nose and a tapered box threaded portion located between the internal shoulder and the box nose, wherein:
      the pin threaded portion and the box threaded portion are configured to engage each other during rotational make-up of the threaded connection,
      the pin threaded portion and the box threaded portion comprise hooked threads providing radial interference between crests of the pin threaded portion and roots of the box threaded portion and/or between crests of the box threaded portion and roots of the pin threaded portion at final make-up of the threaded connection,
      facing load flanks of the hooked threads of the pin threaded portion and the box threaded portion are in contact with each other at final make-up of the threaded connection,
      facing stab flanks of the hooked threads of the pin threaded portion and the box threaded portion are located at a flank distance from each other at final make-up of the threaded connection,
      the threaded connection is at final make-up free from any seal located between the engaged pin and a pin nose stop surface of box threaded portions and the pin nose,
      the box nose is in contact with the external shoulder at final make-up of the threaded connection,
      the pin nose stop surface of the pin nose is located at an internal shoulder distance from an internal stop surface of the internal shoulder at final make-up of the threaded connection,
      the threaded connection defines a central axis at final make-up of the threaded connection,
      the external shoulder comprises a first external shoulder surface, a second external shoulder surface, and a shoulder retainer surface,
      the first external shoulder surface is located at a first radial shoulder distance from the central axis and at a first axial shoulder distance from the pin threaded portion,
      the second external shoulder surface is located at a second radial shoulder distance from the central axis and at a second axial shoulder distance from the pin threaded portion,
      the first radial shoulder distance is larger than the second radial shoulder distance,
      the first axial shoulder distance is smaller than the second axial shoulder distance,
      the shoulder retainer surface is located between the first external shoulder surface and the second external shoulder surface,
      the box nose comprises a first box nose surface, a second box nose surface, and a box retainer surface,
      the first box nose surface is located at a first radial box distance from the central axis and at a first axial box distance from the box threaded portion,
      the second box nose surface is located at a second radial box distance from the central axis and at a second axial box distance from the box threaded portion,
      the first radial box distance is larger than the second radial box distance,
      the first axial box distance is smaller than the second axial box distance,
      the box retainer surface is located between the first box nose surface and the second box nose surface,
      the first external shoulder surface and the first box nose surface are in contact with each other at final make-up of the threaded connection,
      the second box nose surface is located at an external shoulder distance from the second external shoulder surface at final make-up of the threaded connection, and
      the shoulder retainer surface and the box retainer surface are facing each other at final make-up of the threaded connection.

2. The threaded connection according to claim 1, wherein the first external shoulder surface and the first box nose surface extend perpendicular to the central axis of the threaded connection.

3. The threaded connection according to claim 1, wherein the second external shoulder surface and the second box nose surface extend perpendicular to the central axis of the threaded connection.

4. The threaded connection according to claim 1, wherein the first external shoulder surface and the first box nose surface have an axial interference smaller than, or equal to, 0.2 mm at final make-up of the threaded connection.

5. The threaded connection according to claim 1, wherein the external shoulder distance between the second external shoulder surface and the second box nose surface is smaller than, or equal to, 0.3 mm at final make-up of the threaded connection.

6. The threaded connection according to claim 1, wherein:
the shoulder retainer surface extends under an angle φ of between, and including, 5 degrees and 11 degrees relative to the central axis of the threaded connection, and
the box retainer surface extends under an angle ε of between, and including, 5 degrees and 11 degrees relative to the central axis of the threaded connection.

7. The threaded connection according to claim 1, wherein the shoulder retainer surface and the box retainer surface are configured to block radial movement of the box nose away from the central axis.

8. The threaded connection according to claim 1, wherein the threaded connection is at final make-up free from any seal located between the engaged pin and box threaded portions and the box nose.

9. The threaded connection according to claim 1, wherein:
the pin member comprises an internal pin guiding surface located between the pin threaded portion and the pin nose and an external pin guiding surface located between the pin threaded portion and the external shoulder,
the box member comprises an internal box guiding surface located between the box threaded portion and the internal shoulder and an external box guiding surface located between the box threaded portion and the box nose,
the internal pin guiding surface and the internal box guiding surface are configured to move along each other during make-up and are facing each other at final make-up, and
the external pin guiding surface and the external box guiding surface are configured to move along each other during make-up and are facing each other at final make-up.

10. The threaded connection according to claim 1, wherein the radial interference between the crests of the pin threaded portion and the roots of the box threaded portion and/or between the crests of the box threaded portion and the roots of the pin threaded portion at final make-up of the threaded connection is less than 0.25 mm.

11. The threaded connection according to claim 1, wherein the threaded connection is configured to have the pin nose and the internal shoulder in contact with each other while the facing stab flanks are not in contact with each other at final make-up and under a predetermined compressive force working on the threaded connection in a direction of the central axis.

12. The threaded connection according to claim 1, wherein when viewed along the central axis, the facing stab flanks comprise a first spacing from each other greater than a second spacing between the pin nose and the internal shoulder.

13. The threaded connection according to claim 1, wherein the internal shoulder distance is greater than 0 mm and less than 0.3 mm at final make-up of the threaded connection.

14. The threaded connection according to claim 1, wherein the flank distance is between, and including, 0.1 mm and 0.25 mm at final make-up of the threaded connection.

15. The threaded connection according to claim 1, wherein:
the pin member comprises a pin pipe part having a pin pipe part outer surface located at a pin pipe part outer surface radius (R2) from the central axis,
the pin member comprises a pin member shoulder section which forms the external shoulder and is located between the pin pipe part and the pin threaded portion,
the pin member comprises a pin connector part extending from the pin member shoulder section until the pin nose,
the box member comprises a box pipe part having a box pipe part outer surface located at a box pipe part outer surface radius (R3) from the central axis,
the box member comprises a box member shoulder section which forms the internal shoulder and is located between the box pipe part and the box threaded portion,
the box member comprises a box connector part extending from the box member shoulder section until the box nose,
at final make-up, the pin connector part and the box connector part define together an outer connector surface located at an outer connector radius (R4) from the central axis, and
the outer connector radius (R4) is larger than each of the pin pipe part outer surface radius (R2) and the box pipe part outer surface radius (R3).

16. The threaded connection according to claim 1, wherein:
a pin transition area having a pin transition radius (R5) located between the pin pipe part outer surface and the outer connector surface,
a box transition area having a box transition radius (R6) located between the box pipe part outer surface and the outer connector surface, and
the pin transition radius (R5) is equal to or larger than the box transition radius (R6).

17. The threaded connection according to claim 16, wherein the pin transition radius (R5) is between, and including, 2 mm and 20 mm, and the box transition radius (R6) is between, and including, 2 mm and 8 mm.

18. The threaded connection according to claim 1, wherein the pin member and the box member comprise a single step thread formed by the pin threaded portion and box threaded portion, respectively.

19. A method for hammering interconnected tubular members into a ground, such as onshore land, for the exploration and production of a hydrocarbon well, said tubular members being interconnected via a threaded connection according to claim 1, wherein the method comprises hammering the interconnected tubular members after final make-up of the threaded connection has been reached and with the pin member positioned on top of the box member during the hammering.

* * * * *